June 11, 1963  E. V. BROWN  3,093,812
INDUCTION SIGNAL SYSTEM
Filed May 25, 1959  2 Sheets-Sheet 1

INVENTOR.
ELMER VERLIN BROWN
BY Harold B. Hood
ATTORNEY

June 11, 1963 E. V. BROWN 3,093,812
INDUCTION SIGNAL SYSTEM
Filed May 25, 1959 2 Sheets-Sheet 2

INVENTOR.
ELMER VERLIN BROWN
BY
Harold B. Hood
ATTORNEY

United States Patent Office 3,093,812
Patented June 11, 1963

3,093,812
INDUCTION SIGNAL SYSTEM
Elmer Verlin Brown, 918 N. West St., Lebanon, Ind.
Filed May 25, 1959, Ser. No. 815,365
15 Claims. (Cl. 340—58)

The present invention relates to a system whereby the rotation of a rotor may be utilized to induce a current pulse in a signal-controlling circuit, in which system no fallible source of power is required, the arrangement being such that a warning will be given, through the signal system, whenever any deviation arises from a condition to be maintained. The system is presently designed for warning the operator of a road vehicle of loss of optimum pressure in any inflatable tire thereof, and it has been illustrated and will be described in that environment; but, as will be pointed out more particularly hereinafter, the system is capable of use in numerous other connections wherein an accurate measurement of the revolutions of a rotor may be interpreted to accomplish desired results of many kinds.

It is well known that when an inflatable tire is driven over the highway for long periods and at relatively high speeds, heat develops in the body of the tire and that, when the air pressure within the tire falls below an optimum value, the degree of heat so generated rapidly rises. As a consequence, toll road operation of such vehicles will sometimes cause an insufficiently-inflated tire to burst into flames when kindling or ignition temperatures are attained after the vehicle is brought to a halt following a long period of sustained travel at relatively high speeds, or even, on occasion, during such travel. Such an occurrence will sometimes result in loss of control of the vehicle during travel with dire results; but even if the fire develops while the vehicle is standing, tremendous losses sometimes occur; and if the vehicle is a truck carrying a dangerous load such as explosives, noxious gases and the like, great damage may result in the general vicinity of the vehicle.

In these days, when more and more of the nation's commerce is moved by truck, and the proportion of "hot loads" is increasing, the danger of serious damage resulting from the operation of partially deflated tires is becoming more and more critical.

An object of the present invention, then, is to provide a system whereby a dangerous degree of deflation of any one of the tires of a vehicle will be called to the attention of the vehicle operator promptly and continuously, by means independent of external power sources and of such character that a failure of the system will produce the same effect upon the warning device as is produced by partial deflation of a tire.

A further object of the invention is to provide such a system in which the essential elements of the system are of maximum simplicity, whereby the cost of the warning system is held to a minimum and its liability to failure, maladjustment and damage is reduced to a minimum.

Still further objects of the invention will appear as the description proceeds.

It is well known that several different kinds of "rigs" are used in highway transportation including trucks, tractor-trailer assemblies and semi-trailer assemblies. So far as concerns the present invention, all these types of equipment are equivalent; and, in the present specification and in the claims appended thereto, the word "vehicle" is intended comprehensively to include trucks, tractors, trailers, tractor-trailer combinations and semi-trailer combinations as well as passenger automobiles and all other vehicles which operate upon inflatable tires.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figures 1, 2, 3, 5:
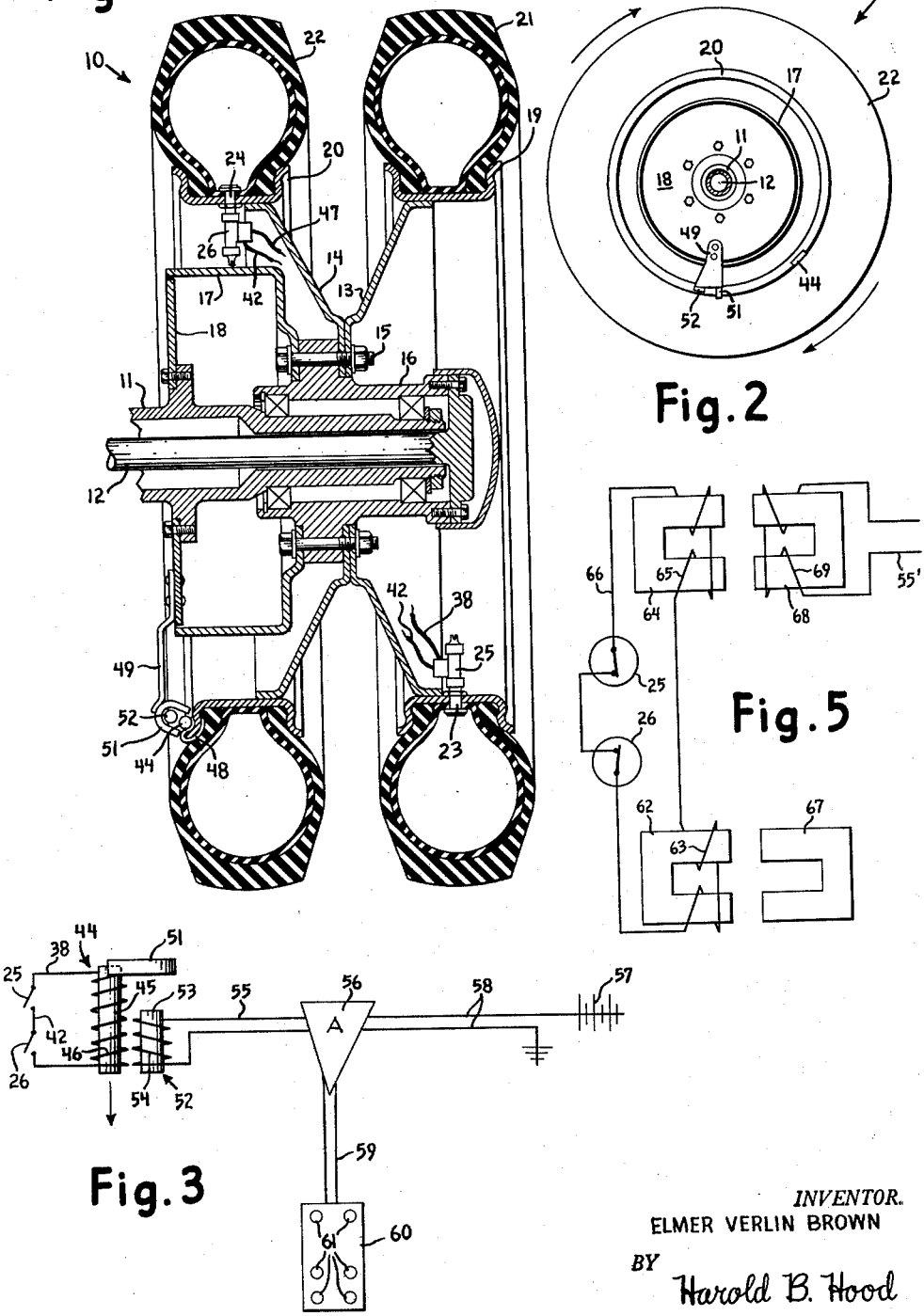
FIG. 1 is an axial section through a conventional form of dual wheel illustrating, somewhat diagrammatically, the wheel-associated elements of my system.
FIG. 2 is a side elevation, drawn to a reduced scale, and looking from the left of FIG. 1.
FIG. 3 is a diagram illustrating the travelling coil and the stationary coil and magnet of one embodiment of my system, and indicating one form of means whereby the winding of the stationary coil may be arranged to dominate a signal device.
FIG. 5 is a diagrammatic illustration of another arrangement of movable coils, switches, stationary coil and magnet which may be used in my system.

Referring more particularly to FIGS. 1 to 4, the reference numeral 10 indicates generally a dual wheel assembly which may be generally of conventional construction. In the illustration, 11 represents a stationary portion of the vehicle chassis through which passes the rotating axle 12. A pair of mating discs 13 and 14 are connected to each other and to a rotating hub 16 by any suitable means such as the studs 15; and a conventional brake drum 17 is correspondingly secured to said hub to rotate therewith. An annular plate or ring 18 is secured to the element 11 and snugly fits within the rim of the brake drum 17, as shown. The disc 13 carries a rim 19 and the disc 14 carries a rim 20, inflatable tires 21 and 22 being conventionally mounted upon said rims, respectively. As shown, each tire is conventionally provided with a valve stem 23 or 24; and pressure responsive switch mechanism 25 or 26 is associated with each of said valve stems.

Figure 4:
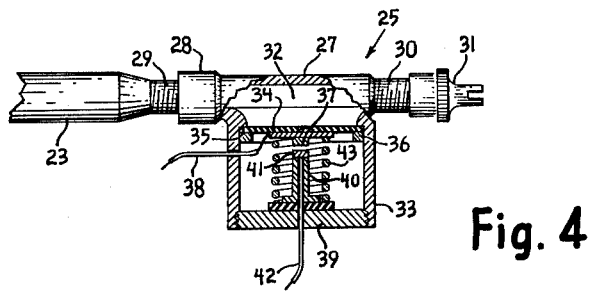
FIG. 4 is an enlarged view, partly in section, of a pressure responsive switch which may be used in my signalling system.

The switches 25 and 26 may be identical and one suitable form of switch is illustrated in detail in FIG. 4. It comprises a body 27 having an internally threaded spud 28 at one end proportioned and designed for threaded reception upon the end 29 of the valve stem 23. At its other end, the body 27 is formed with an externally threaded extension 30 adapted to receive the conventional valve cap 31. Interiorly, the extension 30 is formed for the operative reception of the conventional valve core (not shown) normally mounted in the extension 29 of the stem 23. When the mechanism 25 is to be mounted on a tire, the cap 31 is removed from the stem extension 29 and the valve core is also removed from said stem extension and is remounted in the housing extension 30. The spud 28 of the housing 27 is then threadedly engaged on the valve stem extension 29. Now, the tire may be inflated, to any desired degree, through the housing 27 by applying a conventional air-supply fitting to the housing extension 30; and the cap 31 is then applied to said housing extension.

The housing 27 is formed to provide an internal chamber 32 which, as will be seen, is always in open communication with the interior of the tire. The housing is further formed to provide a lateral extension 33 in the inner end of which is mounted a flexible diaphragm of any suitable air-impermeable material, said diaphragm being seated upon a shoulder 35 within the extension 33 and having its periphery tightly clamped therein by means of, for instance, a ring 36. Thus, the inner surface of the diaphragm 34 is subjected to the pressure within the chamber 32, while the outer surface thereof is exposed to the atmosphere.

A contactor 37 of electrically conductive material is carried approximately at the center of the outer surface of the diaphragm 34 and is electrically connected to a wire 38 for a purpose which will appear.

Threadedly adjustably mounted within the outer end of the extension 33 is a plate or spider 39 which carries on its inner surface an insulated extension 40 terminating in an electrically conductive terminal 41 to which is electrically connected a wire 42. A spring 43 is confined between the plate 39 and the diaphragm 34 and urges the diaphragm in a direction to separate the contactor 37 from the terminal 41. The force of the spring 43 is so calibrated as to be overcome by a pressure of predetermined value within the tire with which the mechanism 25 is associated so that, so long as the pressure value within that tire exceeds a predetermined minimum, the contactor 37 will be held in engagement with the terminal 41; but when the pressure value within that tire falls below such predetermined minimum, the contactor 37 will be moved out of engagement with the terminal 41. The plate 39 may be adjustable to vary the pressure at which the contactor 37 will leave the terminal 41; or other suitable means may be provided for adjusting the effective force of the spring 43.

Mounted to move with the tire 22 is an armature-wound coil indicated generally by the reference numeral 44 and comprising an armature 45 which will preferably be formed of soft iron or the like, and a winding 46. As is suggested in the diagram of FIG. 3, one end of the winding 46 is electrically connected to the wire 38 of the switch mechanism 25 while the wire 42 leads to the switch mechanism 26 and a wire 47 connects the other end of the winding 46 with the switch mechanism 26, whereby the winding 46 is connected in series with the switch mechanisms 25 and 26 in a normally-closed circuit. In the illustrated embodiment of the invention, the coil 44 is permanently carried on a spring clip 48 which may be of the type conventionally used to support wheel balance weights and which is resiliently frictionally mounted at any selected point on the rim 20 which supports the tire 22. While this is a convenient means for mounting the coil 44, it will be obvious that other mounting devices may be alternatively be used.

In the illustrated embodiment of the invention, a bracket 49 is secured to the ring 18 at a convenient point and extends radially therefrom to carry, at its distal end, a permanent magnet 51 so arranged in proximity to the path of the coil 44 that, as said coil passes the magnet, it will pass between the poles of the magnet, thus cutting the magnetic field. While the described arrangement is deemed to be optimum, it will be apparent that the only requisite is that the magnet shall be mounted in such proximity to the path of the coil that the coil will cut the magnetic field of the magnet as it passes.

Closely adjacent the magnet 51, but spaced slightly therefrom in the direction of normal rotation of the wheel 10 is a stationary coil indicated generally by the reference numeral 52 and comprising an armature 53 and a winding 54. The spacing between the magnet 51 and the coil 52 will be so related to the length of the coil 44 (measured in the direction of its path of travel) that the leading end of the coil 44 will reach full registry with the coil 52 before the trailing end of the coil 44 fully leaves the flux field of the magnet 51. Thus, the winding 54 will become subject to the influence of the flux field of the core 45 set up by the current pulse induced in the winding 46 as that winding cuts the field of the magnet 51, but the winding 54 will not respond to any portion of the field of the magnet 51 even as that field is momentarily disturbed or distorted by passage of the coil 44. The winding 54 is connected in a circuit so electrically associated with an electrically-activated signal device, later to be described, that such signal device will be energized whenever a current pulse is induced in the winding 54. As shown in FIG. 3, the winding 54 is connected in a circuit 55 which comprises the control circuit for a conventional amplifying unit 56 powered, from the vehicle battery 57 or any other source of electrical energy, through an input circuit 58. Output circuits 59 lead from the amplifying unit 56 to a plurality of flasher lamps 61 on a panel 60 which will be mounted in such a position within the driver's compartment of the vehicle as to be constantly within the field of vision of the vehicle operator. As suggested in FIG. 3, there will preferably be a separate flasher lamp 61 for each wheel of the vehicle, and the lamps will preferably be arranged on the panel in an order analogous to the arrangement of the wheels of the vehicle. It will be understood, of course, that each wheel of the vehicle will be provided with a travelling coil 44 connected in series with a number of switches equal to the number of tires on that wheel, and with a stationary coil 52 and permanent magnet 51, and that each coil 52 will dominate a separate output circuit from the amplifying unit 56 to energize its corresponding lamp 61.

The operation of the system as thus far described will be analogous for each wheel of the vehicle. Referring to FIG. 1, and assuming that both tires 21 and 22 are inflated to such a degree that the pressure values within the tires equal or exceed the value for which the corresponding switches 25 and 26 are set, as the vehicle moves, the coil 44 will cut the magnetic field of the magnet 51 upon each revolution of the wheel 10 and, since the switches 25 and 26 are closed, a current pulse will be induced in the winding 46 and its circuit 38, 25, 26, 47, whereby the core 45 will be magnetically excited. Now, as the wheel continues to rotate and the coil 44 passes out of the field of the magnet 51, the magnetic field of the core 45 will be moved past the winding 54 of the coil 52, whereby said winding will cut the magnetic field of the core 45 and a current pulse will be induced in the winding 54 and its circuit 55 to actuate the appropriate circuit 59 leading from the amplifying unit 56 to the corresponding bulb 61. Thus, upon each revolution of the wheel 10, its corresponding lamp 61 will flash; and the same thing will be true as to the lamps corresponding to the other wheels of the vehicle.

However, if the pressure value within the tire 22, for instance, should for any reason drop below the predetermined value for which its switch mechanism 26 is set, that switch will open to open the circuit which includes the winding 46. The lamp 61 corresponding to the wheel 10, thereupon, will stop flashing; and the vehicle operator's attention will promptly be called to the fact that one of the tires on the wheel 10 is soft.

The current densities achievable in the winding 54 are, of course, quite low; and for most commercially-available flasher bulbs, the externally energized amplifying unit 56 is necessary if a signal is to be visible on the panel 60 at low vehicle speeds. Even with presently-available lamps, however, the system is effective as a warning to the operator at highway speeds, and therefore the amplifier may be eliminated and a flasher lamp may be connected directly in the circuit 55 if the operator is willing to sacrifice city-speed warnings in order to avoid the expense, and the slight disadvantage, of the amplifying unit. Tests have indicated that, even with presently-available lamps, a suitable indication can be generated at speeds down to 15 to 20 miles per hour, without the amplifier; and it is understood that a still lower energy-consuming bulb of the non-filament neon type (utilizing ionizable gases and having a long life with an equitably high safety factor) will soon be available commercially. It is believed that, when such a lamp is connected directly in the circuit 55, the disclosed system will be effectively operative at speeds as low as 5 to 8 miles per hour.

A major advantage of the present system, of course, is the fact that it is constructed upon a "fail-safe" principle. That is, satisfactory air pressure conditions in the tire are indicated by the affirmative flashing of the signal lamps and unsatisfactory air pressure conditions are indicated by the failure of the lamps to flash. Thus, if anything should go wrong in the system, the operator would be led to check his tires by the failure of the signal lamps to flash; whereas, if the system were so arranged as to cause the lamps to flash to indicate unsatisfactory air pressure conditions, failure of the system would lull the operator into a false sense of security. Where the system is used without the amplifying device 56, this "fail-safe" principle is utilized to a maximum extent, since under those circumstances, the system is entirely self-energized and even battery failure would not cause the system to become inoperative.

In FIG. 5, I have illustrated another arrangement which, in some respects, is an improvement over the system of FIGS. 1 to 3. In the system of FIG. 5, a stationary, armature wound coil 68 includes a winding 69 which is connected in a circuit 55' in which a flasher lamp is directly connected. A first travelling armature wound coil 62 including a winding 63 and a second armature wound coil 64 including a winding 65 are mounted to move with the wheel and the windings 63 and 65 are connected in a circuit 66 in series with each other and with the switches 25 and 26. The coils 62 and 64 are angularly spaced from each other at a common distance from the axis of the wheel, preferably by 180°; and a permanent magnet 67 is stationarily mounted on the vehicle in such a position that, when the coil 62 registers with the magnet 67, the coil 64 will be in registry with the coil 68. With this system, and assuming that the switches 25 and 26 are closed, as the wheel rotates, the coil 62 will cut the magnetic field of the magnet 67 whereby a current pulse will be generated in said coil and in its circuit 66. That current pulse, flowing through the circuit, will energize the winding 65 to excite the core of the coil 64 and, since that coil is currently passing the coil 68, the magnetic field of the coil 64 will be cut by the winding 69, whereby a current pulse will be induced in the winding 69 and so in the circuit 55' to energize the connected lamp 61.

If the coils 62 and 64 and the magnet 67 and coil 68 are spaced 180° from each other, a current pulse will also be induced in the circuit 55' as the coil 64 passes the magnet 67 while the coil 62 is in registry with the coil 68, so that the connected lamp will flash twice for each revolution of the wheel. If, however, the coil 64 is spaced less than 180° or more than 180° from the coil 62 and the coil 68 is correspondingly spaced from the magnet 67, only one current pulse will be induced for each revolution of the wheel.

Figure 6:
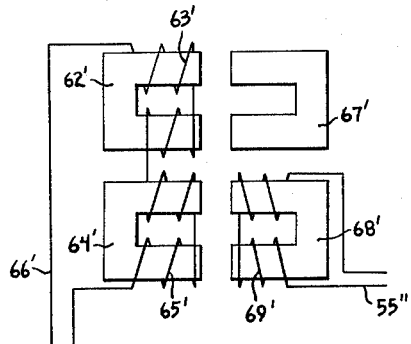
FIG. 6 is a diagrammatic illustration of still another arrangement of coils and magnet.

In FIG. 6, I have illustrated a system in which the angular spacing between the travelling coils and between the magnet and the stationary coil is a minimum. In that arrangement, the coils 62' and 64', with their windings 63' and 65', are arranged closely adjacent each other on the wheel, but at a common distance from the wheel axis. The windings 63' and 65' are connected in a circuit 66' in series with each other and in series with the switches 25 and 26 (not shown). The magnet 67' and the coil 68' with its winding 69' connected in a flasher lamp circuit 55'', are correspondingly spaced from each other so that, as the wheel rotates, the coil 64' will be in registry with the coil 68' as the coil 62' passes the magnet 67'. The operation of this system, to induce a current pulse in the circuit 55'' upon each rotation of the wheel, is analogous to that described in connection with FIG. 5.

Figure 8:
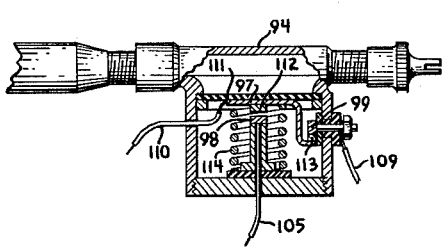
FIG. 8 is a view similar to FIG. 4 but showing a modified form of switch usable in the system of FIG. 7.
Figure 7:
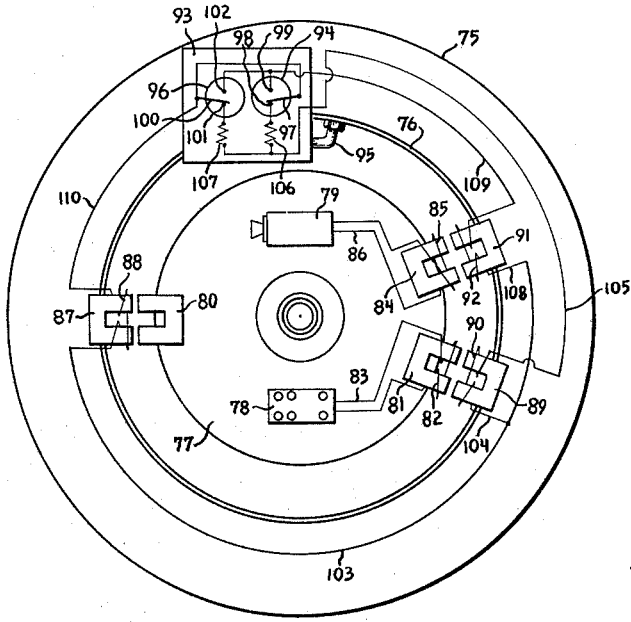
FIG. 7 is a diagrammatic illustration of still another embodiment of my invention, providing for an intermittent or flashing visual signal and further providing for energization of an audible signal upon failure of any one of the visual signal circuits.

In FIGS. 7 and 8, I have illustrated a somewhat more complicated system which, however, has certain advantages over the systems heretofore described. It is highly desirable that the operator of, particularly, a heavy laden vehicle should take prompt action whenever the pressure value within a tire drops below the predetermined minimum. Tire failure, or even a tire fire, can arise in a very short time when a soft tire is operated at turnpike speeds under heavy loads. While it is believed that usually a vehicle operator's attention will be caught quite promptly by the cessation of flashing of one lamp on the panel 60, and that therefore the systems as above described will be satisfactorily effective for most installations, it is highly desirable, particularly where unusually valuable or unusually hazardous loads are being carried, to ensure the operator's attention and action almost instantaneously upon the loss of optimum pressure in a tire. Therefore, for maximum safety, a warning system of the character here under consideration should properly include an audible signal, to be energized instantaneously upon pressure failure to call the attention of the operator particularly to his signal panel. Thus, the audible signal will advise the operator of a failure somewhere, and his panel will instantly tell him where that failure is.

In the form of invention illustrated in FIG. 7, therefore, I prefer to include not only the visual signal device of FIG. 3 but also an audible signal device which will be energized instantly upon loss of optimum pressure in any tire of the vehicle.

Somewhat diagrammatically, FIG. 7 illustrates one tire 75 of a dual wheel, said tire being mounted on a rim 76, and a ring 77 similar to the ring 18 being conventionally associated with the wheel. A visual signal panel board 78 like the board 60 is adapted to be suitably mounted in the vehicle cab; and an audible signal device 79, which will include an amplifier unit, will likewise be mounted in the vehicle.

Fixedly carried on the ring 77, or other stationary part of the vehicle near the wheel axis, is a permanent magnet 80; and a first stationary coil 81 including a winding 82 is mounted on the ring at a point angularly spaced from the magnet 80. The winding 82 is connected in a circuit which is electrically associated with the panel 78 to energize one of the flasher bulbs thereon whenever a current pulse is induced in the winding 82.

A second stationary coil 84 including a winding 85 is likewise mounted on the ring 77 at a point angularly spaced from the coil 81 and from the magnet 80, and its winding 85 is connected in a circuit 86 which is electrically associated with the audible signal device 79 to energize that device whenever a current pulse is induced in the winding 85.

A first travelling coil 87 including a winding 88 is mounted on the wheel rim 76 to travel therewith. A second travelling coil 89 including a winding 90 is mounted on the rim 76 to travel therewith and is spaced angularly from the first coil 87 to a degree equal to the angular spacing between the magnet 80 and the coil 81. A third travelling coil 91 including a winding 92 is mountd on the rim 76 to travel therewith and is angularly spaced from the coil 87 to a degree equal to the spacing between the magnet 80 and the coil 84.

Switch means indicated generally by the reference numeral 93 is also mounted to travel with the wheel and comprises a single-pole double-throw switch 94 which is operatively connected to the valve stem 95 of the tire 75 and a similar switch 96 which is operatively connected to the valve stem (not shown) of the companion tire (not shown) of the dual wheel assembly.

The switch 94 includes a movable contactor 97 alternatively engageable with one terminal 98 of the switch 94 or with the other terminal 99 thereof. Similarly, the switch 96 comprises a movable contactor 100 alternatively engageable with one terminal 101 of said switch or with the other terminal 102 thereof. The switches 94 and 96 are so designed and arranged that, when pressure values within the tire 75 are above a predetermined value, the contactor 97 will be held in engagement with the terminal 98 but when such pressure values fall below that predetermined minimum, the contactor 97 will move into engagement with the terminal 99; and when the pressure values within the companion tire are above a predetermined minimum the contactor 100 will be held in engagement with the terminal 101 and when pressure values within said companion tire fall below the predetermined minimum, the contactor 100 will move to engagement with the terminal 102.

In the somewhat diagrammatic illustration of FIG. 7, the size of the units 87, 89, 91 and 93 is exaggerated for clarity. Of course, in an actual structure, the parts which travel with the wheel will be miniaturized as much as possible, and any asymmetry of their arrangement on the wheel will be balanced by suitable wheel weights (not shown).

In FIG. 8, I have illustrated one form of switch mechanism which may be used in this system. The body of the switch 94, for instance, may be closely similar to the body 27 of the switch 25. The diaphragm 111, which is similar to the diaphragm 34, however, carries the contactor 97 which includes not only a point 112 similar to the contactor 37 and movable into and out of engagement with the terminal 98, but also a point 113 which is movable into and out of engagement with the terminal 99. Obviously, the arrangement is such that, when the pressure values within the switch body exceed a predetermined minimum, the diaphragm 111 will be flexed to hold the point 112 in engagement with the terminal 98; but when such pressure values fall below the predetermined minimum, the spring 114 will flex the diaphragm 111 in the opposite direction to move the point 113 into engagement with the terminal 99.

A wire 103 connects one end of the winding 88, through a lead 104, with one end of the winding 90 of the second travelling coil 89, and a wire 105 connects the other end of said winding 90, through a resistor 106, with the terminal 98 of the switch 94 and, through a resistor 107 in parallel with the resistor 106, to the terminal 101 of the switch 96. The other end of the winding 88 is connected by a wire 110 with the contactor 100 of the switch 96, and in parallel with the contactor 97 of the switch 94.

The wire 103 extends beyond the lead 104 and, through a lead 108, is connected to one end of the winding 92 of the third travelling coil 91, the other end of said winding being connected, through wire 109, with the terminal 99 of the switch 94 and in parallel with the terminal 102 of the switch 96.

The parts are so arranged that the windings of the travelling coils 87, 89 and 91 move in a path which is closely adjacent the magnet 80 and the coils 81 and 84; and the travelling coils 89 and 91 register, respectively, with the stationary coils 81 and 84 when the travelling coil 87 is in registry with the magnet 80.

Thus, when pressure conditions within the tire 75 and its companion are satisfactory, the contactor 97 of the switch 94 will be in engagement with the switch terminal 98 and the contactor 100 of the switch 96 will be in engagement with the terminal 101 so that, as the wheel rotates, a current pulse induced in the winding 88 as that winding passes the magnet 80 will flow, through the circuit 103, 104, winding 90, wire 105, resistances 106 and 107, switches 96 and 94 and wire 110 to induce a current pulse in the winding 82 of the coil 81, thus flashing the corresponding lamp on the panel 78 once for each revolution of the wheel.

If, however, the pressure in the tire 75 should fall below the predetermined minimum value, the movable contactor 97 of the switch 94 would immediately move out of engagement with the terminal 98 and into engagement with the terminal 99, thus closing a circuit from the winding 88 through wire 103, lead 108, winding 92 of coil 91, wire 109, terminal 99, contactor 97 and wire 110 back to the winding 88. Since the latter circuit is devoid of resistance means comparable to the resistance 107 which remains in the circuit which includes the winding 90 of the coil 89, a current pulse now generated in the winding 88 will flow through the winding 92 of the coil 91 and substantially no current will flow through the winding 90 of the coil 89. Consequently, the lamp corresponding to the wheel in question will be extinguished and, instead, the energized coil 91 will induce a current pulse in the winding 85 of the coil 84 to energize the audible signal 79 upon each revolution of the wheel.

Of course, a similar condition will be created with similar results if the companion tire (not shown) should lose pressure to permit the contactor 100 of the switch 96 to move out of engagement with the terminal 101 and into engagement with the terminal 102, even though optimum pressure conditions in the tire 75 continue to maintain the contactor 97 of the switch 94 in its illustrated position.

Thus, it will be clear that, with the system illustrated in FIGS. 7 and 8, so long as satisfactory pressure values are maintained in all tires of the vehicle, the lamps of the panel 78 will twinkle during vehicle movement. In case any tire should lose pressure, however, the signal device 79 will immediately be energized to seize the attention of the vehicle operator. A glance at the panel 78 will show him which wheel of his vehicle is carrying the softened tire; and he can immediately bring the vehicle to a stop and take whatever steps may be necessary to correct the situation.

Preferably, a manual switch (not shown) will be provided in the system whereby, as the operator begins to move his vehicle after a stop, he can deliberately connect the coil 91 in circuit with the coil 87 to test the audible signal device.

Although the somewhat diagrammatic drawings herein show the several travelling components of my systems individually mounted on the tire-carrying wheel rims, it will be clear that those components may be assembled, instead, in proper positional relationship on a ring, disc or similar element of light material and may be thus collectively attached to the wheel or brake drum in proper relationship to the several fixed components of the system.

As stated above, the basic principle of the present invention was conceived primarily for the solution of the problems raised by casual reduction of air pressure in inflatable tires for road vehicles, and it has been illustrated and described herein in that connection. That basic principle, however, and the essential components of the disclosed system, can be utilized to provide one or more precise sources of electronic pulsing patterns which may, through suitable ancillary apparatus, be measured and evaluated, in relation to a control pulse or in relation to each other, with such electronic pulse being accurately interpreted by a suitable electronic interpreting device arranged to operate on a cyclical programming system to control the movements of the vehicle or to call attention to any deviation from optimum conditions within a vehicle. In such uses, of course, the capacity of the system to call attention to a reduction in tire pressure might or might not be utilized.

I claim as my invention:

1. In combination, an electrically-activated signal means, an armature-wound coil stationarily mounted relative to said signal means and electrically associated therewith to energize said signal means whenever a current pulse is induced in said coil, a rotor mounted to turn about an axis which is fixed relative to said coil, and means for inducing at least one current pulse in said coil upon each revolution of said rotor, comprising another armature-wound coil mounted on said rotor to move therewith in a path passing closely adjacent said first-named coil, and a permanent magnet stationarily mounted relative to said rotor axis at a point closely adjacent the path of said other coil so that its magnetic field is cut by said other coil as said rotor turns.

2. In combination with a vehicle having an inflatable tire mounted to rotate about an axle, an electrically-activated signal means carried on the vehicle, an armature-wound coil stationarily mounted relative to said axle and electrically associated with said signal means to energize the same whenever a current pulse is induced in said coil, and means for inducing at least one current pulse in said coil upon each revolution of said tire, comprising another armature-wound coil mounted on said tire to move therewith in a path passing closely adjacent said first-named coil, an electrically-conductive circuit comprising the winding of said other coil, switch means and conductive means connecting said switch means in series with said winding, said switch means being biased to open condition but being responsive to pressure values within said tire above a predetermined minimum to remain closed, and a permanent magnet stationarily mounted relative to said axle at a point closely adjacent the path of said other coil so that its magnetic field is cut by said other coil as said tire turns.

3. In combination with a vehicle having an inflatable tire mounted to rotate about an axle, an electrically-activated signal means carried on the vehicle, an armature-wound coil stationarily mounted relative to said axle and electrically associated with said signal means to energize the same whenever a current pulse is induced in said coil, and means for inducing at least one current pulse in said coil upon each revolution of said tire, comprising another armature-wound coil mounted on said tire to move therewith in a path passing closely adjacent said first-named coil, said other coil being connected in an electrically-conductive circuit including switch means, said switch means being responsive to pressure values within said tire above a predetermined value to remain in circuit-closing condition but being biased away from said condition, and a permanent magnet stationarily mounted relative to said tire at a point closely adjacent the path of said other coil so that its magnetic field is cut by said other coil as said tire turns.

4. In combination, an electrically-activated signal means, an armature-wound coil stationarily mounted relative to said signal means and electrically associated therewith to energize said signal means whenever a current pulse is induced in said coil, a rotor mounted to turn about an axis which is fixed relative to said coil, another armature-wound coil mounted on said rotor to move, upon rotation of said rotor, in a path passing closely adjacent said first-named coil, said other coil being connected in a normally-closed circuit, and a permanent magnet stationarily mounted relative to said rotor axis closely adjacent the path of said other coil and slightly in advance of said first-named coil whereby said other coil will cut the magnetic field of said magnet and then immediately pass closely adjacent said first-named coil as said rotor turns.

5. In combination with a vehicle having a dual wheel and an inflatable tire on each rim of said wheel, an electrically-activated signal means carried on said vehicle, an armature-wound coil stationarily mounted on said vehicle near the axis of said wheel and electrically associated with said signal means to energize the same whenever a current pulse is induced in said coil, and means for inducing at least one current pulse in said coil upon each revolution of said wheel, comprising another armature-wound coil mounted on said wheel to move therewith in a path passing closely adjacent said first-named coil, a first switch biased to open position but responsive to pressure values within one of said tires above a predetermined minimum to remain closed, a second switch biased to open position but responsive to pressure values within the other of said tires above a predetermined minimum to remain closed, said switches being mounted to move with said tires, respectively, an electrically-conductive circuit comprising the winding of said other coil, said switches and conductive means connecting said winding and said switches in series, and a permanent magnet stationarily mounted relative to the axis of said wheel at a point closely adjacent the path of said other coil so that its magnetic field is cut by said other coil upon each revolution of said wheel.

6. In combination with a vehicle having a dual wheel and an inflatable tire on each rim of said wheel, an electrically-activated signal means carried on said vehicle, an armature-wound coil stationarily mounted on said vehicle near the axis of said wheel and electrically associated with said signal means to energize the same whenever a current pulse is induced in said coil, and means for inducing at least one current pulse in said coil upon each revolution of said wheel, comprising another armature-wound coil mounted on said wheel to move therewith in a path passing closely adjacent said first-named coil, a first switch biased to open position but responsive to pressure values within one of said tires above a predetermined minimum to remain closed, a second switch biased to open position but responsive to pressure values within the other of said tires above a predetermined minimum to remain closed, said switches being mounted to move with said tires, respectively, said other coil and said switches being series connected in a normally-closed circuit, and a permanent magnet stationarily mounted relative to the axis of said wheel at a point closely adjacent the path of said other coil so that its magnetic field is cut by said other coil upon each revolution of said wheel.

7. In combination with an inflatable vehicle tire, an armature-wound coil mounted to move with said tire, an electrically-conductive circuit comprising the winding of said coil, switch means and conductive means connecting said switch means in series with said winding, said switch means being biased to circuit-open condition but being responsive to pressure values within said tire above a predetermined minimum to remain closed, a permanent magnet stationarily mounted on the vehicle closely adjacent the path of said coil whereby the magnetic field of said magnet will be cut by said winding upon rotation of said tire, a second armature-wound coil stationarily mounted on the vehicle closely adjacent the path of said first-named coil at a point beyond, but closely adjacent, said magnet whereby the induced magnetic field of said first-named coil will be cut by the winding of said second coil as said first-named coil leaves the magnetic field of said magnet and passes said second coil, and an electrically-activated signal means, said second coil being connected in a circuit effective to energize said signal means when a current pulse is induced in said second coil.

8. In combination, an electrically-activated signal means, an armature-wound coil stationarily mounted relative to said signal means and electrically associated therewith to energize said signal means whenever a current pulse is induced in said coil, a permanent magnet stationarily mounted relative to, and spaced from, said coil, a rotor mounted to turn about an axis which is fixed relative to said coil and magnet, a first travelling, armature-wound coil and a second travelling, armature-wound coil, said travelling coils being mounted on said rotor at points radially spaced from the rotor axis and being angularly spaced from each other, said stationary coil and said magnet being located closely adjacent the paths of said travelling coils and being so spaced from each other that, as said first travelling coil passes said magnet during rotation of said rotor it will cut through the magnetic field of said magnet and said second travelling coil will concurrently pass said stationary coil, the windings of said travelling coils being connected in series in a normally-closed circuit.

9. In combination with a vehicle having an inflatable tire mounted to rotate about an axle, an electrically-activated signal means carried on the vehicle, an armature-wound coil stationarily mounted on said vehicle adjacent said axle and electrically associated with said signal means to energize said signal means whenever a current pulse is induced in said coil, a permanent magnet stationarily mounted relative to, and spaced from, said coil, a first travelling, armature-wound coil and a second travelling, armature-wound coil, said travelling coils being mounted to move with said tire at points radially spaced from said axle and being angularly spaced from each other, said stationary coil and said magnet being located closely adjacent the paths of said travelling coils and being so spaced from each other that, as said first travelling coil passes said magnet during rotation of said wheel it will cut through the magnetic field of said magnet and said second travelling coil will concurrently pass said stationary coil, switch means mounted to move with said tire, and a conductive circuit comprising the windings of said travelling coils, said switch means and conductive means connecting said windings in series with each other and with said switch means, said switch means being biased to open position but being responsive to desired pressure values within said tire to remain in closed position.

10. In combination, a first electrically-activated signal device, a second electrically-activated signal device, a first stationary, armature-wound coil electrically associated with said first signal device to energize the same whenever a current pulse is induced in said first stationary coil, a second stationary, armature-wound coil electrically associated with said second signal device to energize the same whenever a current pulse is induced in said second stationary coil, said stationary coils being equidistant from a common center and being spaced from each other about said center, a permanent magnet stationarily mounted at the same distance from said center and spaced from said coils, a rotor mounted to turn about said center, a first travelling, armature-wound coil, a second travelling, armature-wound coil and a third travelling, armature-wound coil mounted on said rotor to travel, upon rotation of said rotor, in a path closely adjacent said stationary coils, said travelling coils being so spaced about said center that, when said first travelling coil registers with said magnet, said second travelling coil will register with said first stationary coil and said third travelling coil will register with said second stationary coil, single-pole double-throw switch means mounted on said rotor, and conductor means connecting the windings of said first and second travelling coils in series with each other and with one terminal of said switch means and connecting the windings of said first and third travelling coils in series with each other and with the other terminal of said switch means.

11. In combination, a first electrically-activated signal device, a second electrically-activated signal device, a first stationary, armature-wound coil electrically associated with said first signal device to energize the same whenever a current pulse is induced in said first stationary coil, a second stationary, armature-wound coil electrically associated with said second signal device to energize the same whenever a current pulse is induced in said second stationary coil, said stationary coils being equidistant from a common center and being spaced from each other about said center, a permanent magnet stationarily mounted at the same distance from said center and spaced from said coils, a rotor mounted to turn about said center, a first travelling, armature-wound coil, a second travelling, armature-wound coil and a third travelling, armature-wound coil mounted on said rotor to travel, upon rotation of said rotor, in a path closely adjacent said stationary coils, said travelling coils being so spaced about said center that, when said first travelling coil registers with said magnet, said second travelling coil will register with said first stationary coil and said third travelling coil will register with said second stationary coil, two single-pole double-throw switches mounted on said rotor, and conductor means connecting the windings of said first and second travelling coils in series with each other and, through separate resistors, with one terminal of each of said switches in parallel, and connecting the windings of said first and third travelling coils in series with each other and with the other terminal of each of said switches in parallel.

12. In combination with a vehicle having an inflatable tire mounted to rotate about an axle, a first electrically-activated signal device carried on the vehicle, a second electrically-activated signal device carried on the vehicle, a first armature-wound coil stationarily mounted on said vehicle adjacent said axle and electrically associated with said first signal device to energize the same whenever a current pulse is induced in said first coil, a second armature wound coil stationarily mounted on said vehicle adjacent said axle and electrically associated with said second signal device to energize the same whenever a current pulse is induced in said second coil, said coils being equidistant from said axle and angularly spaced from each other about said axle, a permanent magnet stationarily mounted at the same distance from said axle and angularly spaced from said coils, a first travelling, armature-wound coil, a second travelling, armature-wound coil and a third travelling, armature-wound coil mounted to travel with said tire, upon rotation of said tire, in a path closely adjacent said stationary coils, said travelling coils being so angularly spaced that, when said first travelling coil registers with said magnet, said second travelling coil will register with said first stationary coil and said third traveling coil will register with said second stationary coil, single-pole double-throw switch means mounted to travel with said tire and including a movable contactor biased away from one terminal of said switch means and toward engagement with the other terminal thereof, said contactor being responsive to pressure values within said tire above a predetermined minimum to remain in engagement with said one terminal, and conductor means connecting the windings of said first and second travelling coils in series with each other and with said one terminal of said switch means and connecting the windings of said first and third travelling coils in series with each other and with the other terminal of said switch means.

13. In combination with a vehicle having a dual wheel mounted to rotate about an axle and an inflatable tire on each rim of said wheel, a pressure-responsive, single-pole double-throw switch for each tire mounted on said wheel, each switch including a movable contactor biased away from one terminal and toward engagement with the other terminal of its switch but maintained in engagement with said one terminal by pressure values within its associated tire above a predetermined minimum, a first electrically-activated signal device carried on the vehicle, a second electrically-activated signal device carried on the vehicle, a first armature-wound coil stationarily mounted on said vehicle adjacent said axle and electrically associated with said first signal device to energize the same whenever a current pulse is induced in said first coil, a second armature-wound coil stationarily mounted on said vehicle adjacent said axle and electrically associated with said second signal device to energize the same whenever a current pulse is induced in said second coil, said coils being equidistant from said axle and angularly spaced from each other about said axle, a permanent magnet stationarily mounted at the same distance from said axle and angularly spaced from said coils, a first travelling, armature-wound coil, a second travelling, armature-wound coil and a third travelling, armature-wound coil mounted to travel with said wheel, upon rotation of said wheel, in a path closely adjacent said stationary coils, said travelling coils being so angularly spaced that, when said first travelling coil registers with said magnet, said second travelling coil will register with said first stationary coil and said third travelling coil will register with said second stationary coil, and conductor means connecting the windings of said first and second travelling coils in series with each other and, through separate resistors, with said one terminal of each of said switches in parallel, and connecting the windings of said first and third travelling coils in series with each other and with the other terminal of each of said switches in parallel.

14. In combination with a vehicle having an inflatable tire, an electrically-activated signal device stationarily mounted on said vehicle, means including an armature-wound coil stationarily mounted on said vehicle and electrically associated with said signal device to energize said signal device whenever a current pulse is induced in said coil, a permanent magnet stationarily mounted on said vehicle adjacent said tire, and means mounted to rotate with said tire and effective, only when pressure values within said tire exceed a predetermined minimum, to induce at least one current pulse in said coil upon each revolution of said tire.

15. The combination of claim 14 in which said last-named means includes a second armature-wound coil and a pressure sensitive switch connected in series with the winding of said second coil, said switch being so constructed and arranged as to be closed only when pressure values within said tire exceed a predetermined minimum.

References Cited in the file of this patent
UNITED STATES PATENTS

| | | |
|---|---|---|
| 1,134,758 | North | Apr. 6, 1915 |
| 2,037,016 | Fator | Apr. 14, 1936 |
| 2,629,086 | Ainsworth et al. | Feb. 17, 1953 |
| 2,834,953 | Bechberger | May 13, 1958 |
| 2,894,246 | Degraffenried | July 7, 1959 |